US012576571B2

(12) United States Patent
Lewczyk et al.

(10) Patent No.: US 12,576,571 B2
(45) Date of Patent: Mar. 17, 2026

(54) PELLET MANUFACTURING FOR FOAM AND PRODUCTS

(71) Applicant: Cruz Foam, Inc., Santa Cruz, CA (US)

(72) Inventors: William Thomas Lewczyk, Santa Cruz, CA (US); Juan Manuel Bravo, Fairlawn, OH (US); Maanas Maheshwari, Greensboro, NC (US); Nicholas Cesario, Santa Cruz, CA (US); John Selberg, Santa Cruz, CA (US); Brandon Miller, Truckee, CA (US)

(73) Assignee: CRUZ FOAM, INC., Santa Cruz, CA (US)

( * ) Notice: Subject to any disclaimer, the term of this patent is extended or adjusted under 35 U.S.C. 154(b) by 0 days.

(21) Appl. No.: 18/690,604

(22) PCT Filed: Sep. 9, 2022

(86) PCT No.: PCT/US2022/076233
§ 371 (c)(1),
(2) Date: Mar. 8, 2024

(87) PCT Pub. No.: WO2023/039544
PCT Pub. Date: Mar. 16, 2023

(65) Prior Publication Data
US 2024/0375335 A1     Nov. 14, 2024

Related U.S. Application Data

(60) Provisional application No. 63/242,397, filed on Sep. 9, 2021.

(51) Int. Cl.
*B29C 48/00*      (2019.01)
*B29C 48/04*      (2019.01)
*B29C 48/285*     (2019.01)

(52) U.S. Cl.
CPC ........ *B29C 48/0022* (2019.02); *B29C 48/022* (2019.02); *B29C 48/04* (2019.02);
(Continued)

(58) Field of Classification Search
None
See application file for complete search history.

(56) References Cited

U.S. PATENT DOCUMENTS

| | | | |
|---|---|---|---|
| 2007/0021515 A1* | 1/2007 | Glenn ...................... | C08J 9/125 521/99 |
| 2021/0130589 A1* | 5/2021 | Niles ...................... | B65D 81/09 |

FOREIGN PATENT DOCUMENTS

| | | | |
|---|---|---|---|
| KR | 2013 006 8620 A | * | 6/2013 |
| KR | 10-1436916 B1 | | 8/2014 |

OTHER PUBLICATIONS

International Search Report and Written Opinion mailed Dec. 8, 2022, issued in corresponding international Application No. PCT/US2022/076233, filed Sep. 9, 2022, 13 pages.

* cited by examiner

*Primary Examiner* — Mohammad M Ameen
(74) *Attorney, Agent, or Firm* — Christensen O'Connor Johnson Kindness PLLC

(57)     ABSTRACT

A method is described. The method comprising inputting starch into an extruder, inputting a plasticizer into the extruder, outputting an extrudate from the extruder, and chopping the extrudate output from the extruder into pellets. The extrudate includes the starch and the plasticizer. A pellet for manufacturing a biodegradable product is described. The pellet comprises starch and a plasticizer. A composition of the pellet, by weight percent, includes a starch weight percent representative of the starch included in the pellet and a plasticizer weight percent representative of the plasticizer (Continued)

included in the pellet. The starch weight percent is greater than the plasticizer weight percent and a density of the pellet is at least 0.5 g/cm$^3$.

19 Claims, 4 Drawing Sheets

(52) U.S. Cl.
CPC .... *B29C 48/285* (2019.02); *B29C 2793/0027* (2013.01); *B29C 2948/9219* (2019.02); *B29K 2003/00* (2013.01)

100

300

305
PREMIX SOLID COMPONENTS

310
INPUT THE SOLID COMPONENTS INTO THE EXTRUDER

315
INPUT LIQUID COMPONENTS INTO THE EXTRUDER

320
OUTPUT EXTRUDATE

325
CHOP EXTRUDATE INTO PELLETS

330
INPUT THE PELLETS INTO THE EXTRUDER OR INJECTION MOLDER

335
OUTPUT PRODUCT BASED ON THE PELLETS FROM THE EXTRUDER OR THE INJECTION MOLDER

PELLET MANUFACTURING FOR FOAM AND PRODUCTS

CROSS-REFERENCE TO RELATED APPLICATION

This application is a national stage application, filed under 35 U.S.C. § 371, of International Patent Application No. PCT/US2022/076233 filed Sep. 9, 2022, which claims the benefit of U.S. Provisional Application No. 63/242,397, filed on Sep. 9, 2021, each of which is hereby incorporated by reference in its entirety.

TECHNICAL FIELD

This disclosure relates generally to pellet manufacturing for foam and products, and in particular but not exclusively, relates to biodegradable pellet manufacturing.

BACKGROUND INFORMATION

Plastic pollution is hazardous to life on earth. Plastic may take hundreds of years to degrade, may be ingested by animals and humans, and may cause health problems such as cancer. Plastic foams (e.g., expanded polystyrene) are ubiquitously used as packaging materials and significantly contribute to environmental plastic pollution.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Set forth herein are non-toxic biodegradable pellets, foam, products and methods of pellet, product, and foam production that solve the problems associated with conventional plastics and plastic foams. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

Inorganic plastics and plastic foams are ubiquitous. Expanded polystyrene is regularly used as a packaging material. However, inorganic plastics and plastic foams have become a major environmental pollutant, do not biodegrade, use toxic non-renewable precursors, and may cause health problems such as cancer.

Described herein are precursors and methods of manufacturing which may be used to make biodegradable nontoxic polymers and polymer foams. The nontoxic polymers and polymer foams described herein may use renewable precursors and do biodegrade. Thus, the polymers (e.g., pellets, foam, and/or products) and methods of manufacturing described in embodiments disclosed herein may solve at least some of the problems associated with conventional inorganic plastic foams and foam-based products.

Figure 1:
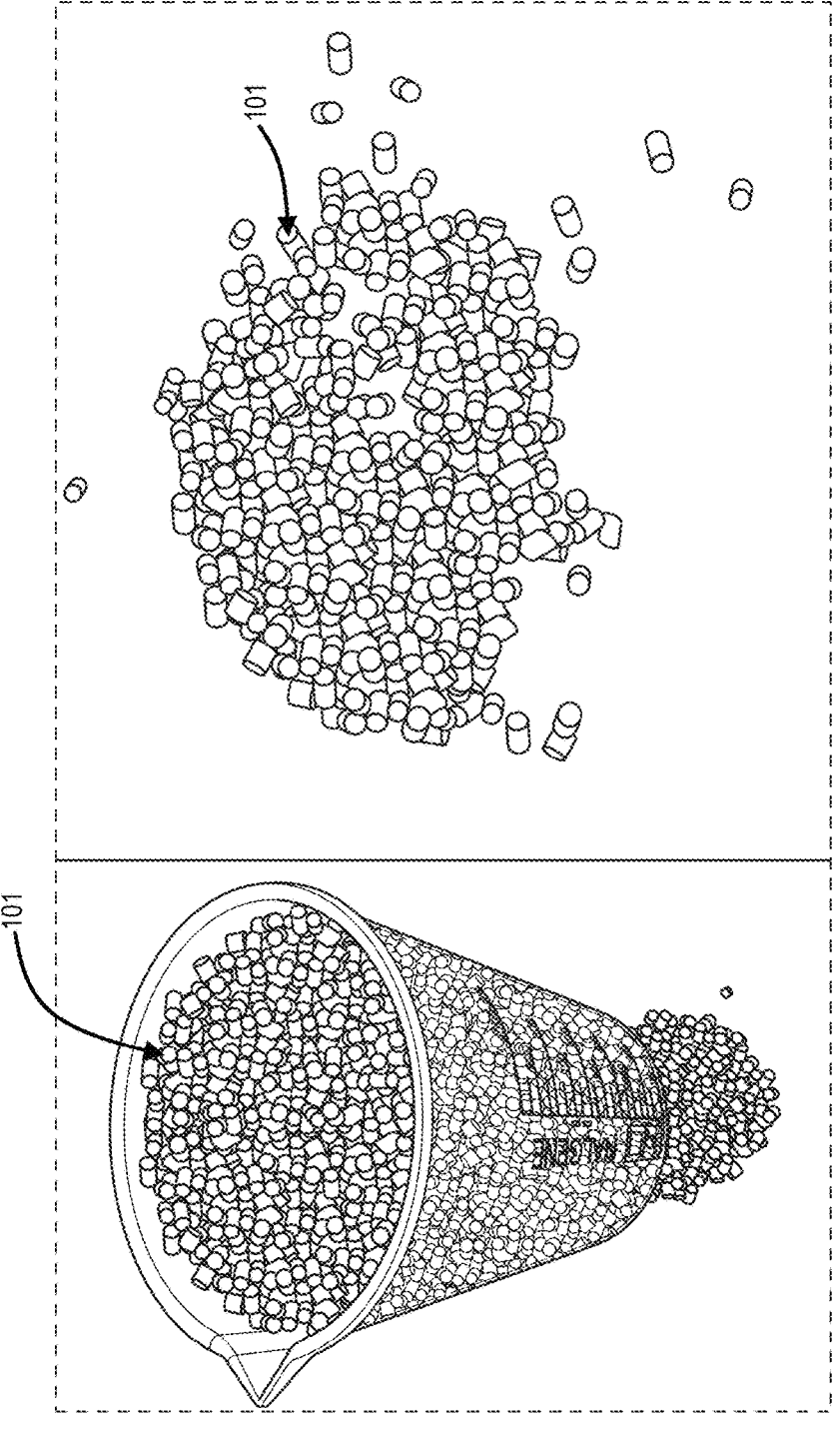
FIG. 1 illustrates example pellets produced using the ingredients and methods described herein, in accordance with embodiments of the present disclosure.

FIG. 1 illustrates a view 100 of example pellets 101 produced using the ingredients and methods described herein, in accordance with embodiments of the present disclosure. The pellets 101 correspond to an agglomeration of smaller particles or powders into a larger object. In the illustrated embodiment, the pellets 101 generally have a substantially uniform cylindrical shape with an are less than one cm$^3$. However, in other embodiments, the pellets 101 may have a non-uniform size and/or shape. In the same or other embodiments, the pellets 101 may be larger or smaller than one cm$^3$. The pellets 101 represent building blocks for forming larger and generally less dense products (e.g., foam). More specifically, the pellets 101 may form a larger structure by adhering, blending, or otherwise combining the pellets 101 together by using heat, pressure, and/or solvents.

Advantageously, the pellets 101 can be efficiently transported in bulk to a manufacturing facility where they can be reformed into larger, less dense structures, as described above. This is partially useful when there is a significant density between the pellets 101 and the larger structure (i.e., the resultant product formed from the pellets 101). For example, the resultant product may correspond to foam, which has a low density (e.g., less than 1 g/cm$^3$, less than 0.5 g/cm$^3$, less than 0.3 g/cm$^3$, or less than 0.1 g/cm$^3$) due to most volume of the foam corresponding to air. The low density of foams therefore take up significant space, which may result in transportation costs over extended distances being prohibitive due to very little material actually being transported per volume of shipping space (e.g., poor weight to volume utilization). Conversely, the pellets 101, which may have a higher density relate to the resultant product (e.g., foam) are able to be transferred with greater efficiency since more of the pellets 101 by weight may be transported within a given volume (e.g., the pellets 101 can be transported with a end weight to volume utilization). Upon arrival to an end destination (e.g., a manufacturing site), the pellets 101 may then be reformed into three-dimensional foam shapes (i.e., the resultant product). Accordingly, transporting the pellets 101 closer to the products targeted destination (e.g., a manufacturing site, distribution center, or otherwise) is more cost effective than transporting the product (i.e., foam).

It is appreciated that the pellets 101 may be non-toxic and/or biodegradable materials to form comparable non-toxic and/or biodegradable foams or other products. In several embodiments, the pellets 101 includes one or more polymers, one or more plasticizers, one or more processing aids, one or more nucleators, one or more fillers, or combinations thereof. The one or more polymers provide an interconnected matrix that give the pellets 101 form. The one or more plasticizers correspond to additives that impart flexibility and/or softness. Plasticizers may also be processing aids that can be utilized to decrease viscosity and shear during processing (e.g., when forming the pellets 101). The one or more processing aids are any additive that enhances the ease of processing such as lowering processing temperature, decreasing shear and viscosity during processing, improving surface quality, and achieving higher throughput. In some embodiments, a subset of processing aids referred to as lubricants may also be included. The lubricants are any additive to a material that reduces friction during processing. Specifically, the lubricants can decrease shear and viscosity during processing without significantly affecting the pellets 101 (or the end product produced from the pellets 101) plasticity. Additionally, lubricants also can affect the surface quality of an extrudate. The one or more nucleators are any additives used to enhance foaming by providing nucleation sites for gas evolution (e.g., to foam the pellets 101 as described in FIG. 3). Finally, the one or more fillers correspond to any material to enhance the physical properties or reduce cost of the pellets 101 and/or the product produced from the pellets 101. In some embodiments, the plasticizers may be in larger amounts than processes aids/lubricants. In some embodiments, the lower amount of the lubricants is enforced to mitigate the lubricants from changing the end properties of the extrudate, pellets, and/or product.

In some embodiments, the one or more polymers include starch (e.g., corn starch, potato starch, pea starch, or the like), chitosan, or combinations thereof. In the same or other embodiments, the one or more plasticizers include urea, glycerol, sorbitol, soybean oil, polymeric plasticizers, or combinations thereof. In the same or other embodiments the one or more processing aids include glycerol monostearate, glycerol distearate, metallic stearates, natural and synthetic waxes, talc, borax, resins, other polymers (such as ethylene vinyl acetate, ethylene vinyl alcohol, acrylonitrile butadiene styrene, polybutylene adipate terephthalate), or combinations thereof. In the same or other embodiments, the one or more nucleators include talc, calcium carbonate, clay compounds, minerals, fibers, or combinations thereof. It is appreciated that minerals and/or clay compounds may correspond to kaolin clay, lamellar clay, diatomaceous earth, boron nitride, silicon dioxide, silica, titanium dioxide, aluminum dioxide, iron oxide, or combinations thereof. In the same or other embodiments, the one or more fillers includes sawdust, fibers, flours, powders, talc, waste product materials, or combinations thereof. Examples of flours include corn flour, sawdust flour, or combinations thereof. Examples of powders include talc, carbon black, calcium carbonate, kaolin clay, or combinations thereof. The waste product materials correspond to anything from industry waste that may be used, examples of which include denim, silk, paper pulp, chitin, wood flour, fly ash, or combinations thereof. In some embodiments, the pellets 101 may also include one or more acids (e.g., acetic acid) and/or water.

Figures 2A, 2B:
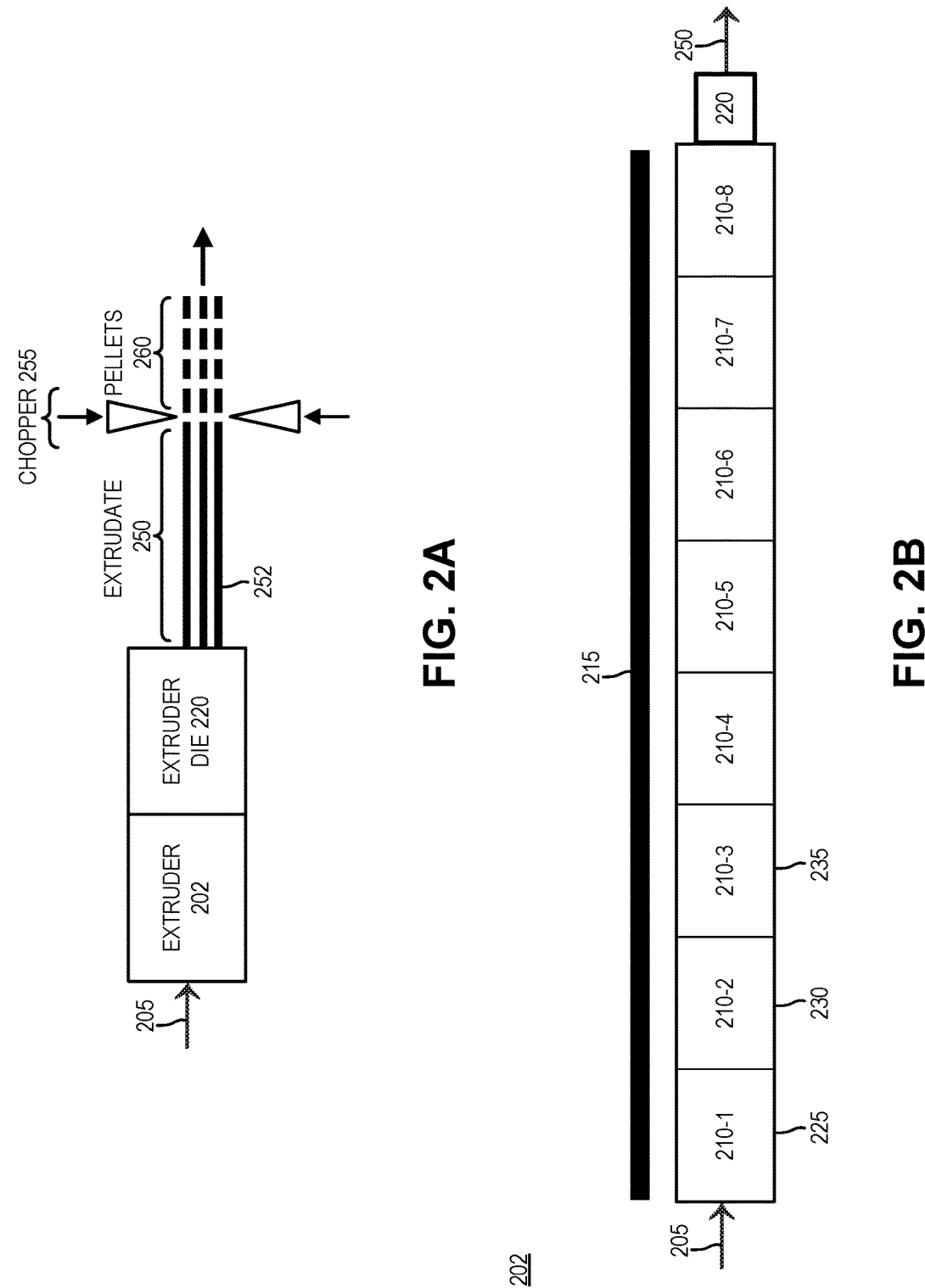
FIG. 2A illustrates an example schematic for fabricating pellets, in accordance with embodiments of the present disclosure.
FIG. 2B illustrates a more detailed view of an extruder in the example schematic of FIG. 2A, in accordance with embodiments of the present disclosure.

FIG. 2A illustrates an example schematic 200 for fabricating pellets 260, in accordance with embodiments of the present disclosure. It is appreciated that the pellets 260 may correspond to the pellets 101 illustrated in FIG. 1. In the illustrated embodiment of FIG. 2A, the pellets 260 may be formed via an extruder 202, which optionally may include an extruder die 220. Extrusion is a process used to create objects by pushing material through an opening or a die of a desired cross-section shape and size. Extrusion creates excellent surface finish and gives considerable freedom of form in the design process. In some embodiments, extrusion may be continuous (e.g., theoretically producing indefinitely long material) or semi-continuous (e.g., producing many pieces). In the illustrated embodiment, the extruder 202 produces an extrudate 250, which may be a continuous or semi-continuous object.

As illustrated in FIG. 2A, solid and/or liquid input ingredients 205 are input into the extruder 202 in one or more inputs proximate to a first end of the extruder that is opposite of a second end (e.g., an output or terminal end proximate to the die 220). The extruder 202 mixes and heats the input ingredients to continuously produce the extrudate 250. In some embodiments, the extruder die 220 is referred to as a "stranding die" that has many holes through which the extrudate blows to form one or more strands 252 of the extrudate 250. These strands may then be cooled and cut into smaller pieces (e.g., via the chopper 255) to produce the pellets 260.

FIG. 2B illustrates a more detailed view of the extruder 202 in the example schematic 200 of FIG. 2A, in accordance with embodiments of the present disclosure. In the example block diagram, the extruder 202 includes a plurality of modules 210 (e.g., a first module 210-1, a second module 210-2, a third module 210-3, and so on). It is appreciated that the plurality of modules 210 are not intended to be limiting as there may be more or less modules than the illustrated eight modules (e.g., 210-1 through 210-8). Additionally, it is noted that while the plurality of modules 210 are arranged in sequential order, there may be additional modules between adjacent modules, in some embodiments. For example, in one embodiment there may be one or more modules included in the plurality of modules 210 between the second module 210-2 and the third module 210-3. In the illustrated embodiment, input ingredients 205 are input into the extruder 202 for forming the extrudate 250, which flow along the extruder 202 in the direction of the arrow 205 until the extrudate 250 is output. More specifically, the input ingredients for forming the extrudate 250 flows in the from a first end (e.g., proximate to the first module 210-1, the second module 210-2, and/or the third module 210-3) of the extruder 202 toward the second end of the extruder 202 (e.g., proximate to the extruder die 220 of the extruder 202) opposite the first end of the extruder 202. In some embodiments, the first module 210-1 is configured to provide a vent to atmosphere, the second module 210-2 is configured to input one or more solid feeds (e.g., solid components to feed into the extruder 202 such as one or more of the polymers, one or more of the plasticizers, one or more of the nucleators, one or more of the fillers, any other solid component or ingredient of the extrudate 260, or combinations thereof), and the third module 210-3 is configured to input one or more liquid feeds (e.g., liquid components to feed into the extruder 202 such as one or more of water, acid, or any other liquids included in the input ingredients 205 for forming the extrudate 250). In some embodiments, the second module 210-2 may be referred to as a solid input and the third module 210-3 may be referred to as a liquid input. As illustrated, the third module 210-3 is disposed between the second module 210-2 and the second end of the extruder 202 (i.e., the terminal end of the extruder 202 proximate to the extruder die 220). Additionally, the third module 210-3 is disposed between the first end and the second end of the extruder 202. In some embodiments, the liquid components includes an aqueous acid solution (e.g., an acid diluted in water) and the solid components include a base (e.g., sodium bicarbonate, calcium bicarbonate, and so on). In some embodiments, the base reacts with the aqueous acid solution to form one or more salts included in the foam.

In some embodiments, the extruder 202 may be a twin screw extruder and the barrel (e.g., the plurality of modules 210) of the extruder 202 may be heated between the first end and the second end (e.g., via heater 215). As illustrated, the mixture of components proceeded through the plurality of modules 210 may form the extrudate 260, which is passed through the extruder die 220 proximate to the second end of the extruder 202 to impart a cross sectional shape to the foam. However, it is appreciated that the extruder die 220 is an optional component and may be omitted in some embodiments such that the terminal end of the extruder 202 has no die or restriction through which the extrudate 250 passes.

Figure 3:
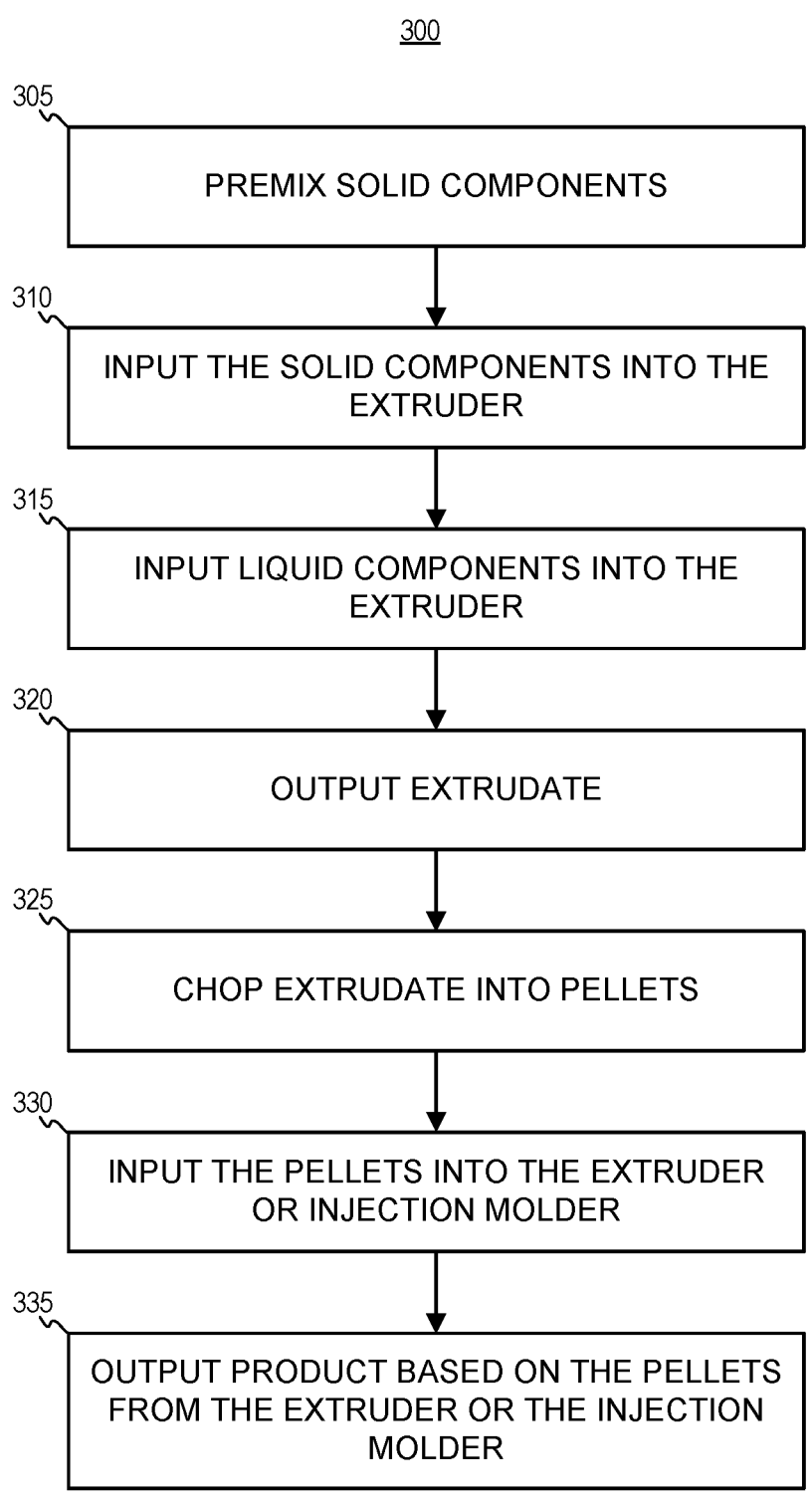
FIG. 3 illustrates an example method for fabricating pellets and a product, in accordance with embodiments of the present disclosure.

FIG. 3 illustrates an example method 300 for fabricating pellets and a product, in accordance with embodiments of the present disclosure. The example method 300 includes process blocks 305, 310, 315, 320, 325, 330, and 335. It is appreciated that while the process blocks of the method 300 illustrated in FIG. 3 are provided in a specific order, in other embodiments a different order of the process blocks 305-335 may be utilized. Additionally, process steps may be added to, or removed from, the method 300 in accordance with the embodiments of the present disclosure. It is further appreciated that the method 300 is one possible way of forming the pellets 101 illustrated in FIG. 1, the pellets 260 illustrated in FIG. 2A, and the extrudate 250 illustrated in FIG. 2A and FIG. 2B, in accordance with embodiments of the present disclosure.

Block 305 shows optionally premixing solid input ingredients to be input into an extruder (e.g., to form a homogeneous mixture of the solid components included in the input ingredients for forming the extrudate, foam, and/or product). In some embodiments, some or all of the solid components are mixed prior to being input into the extruder. In other embodiments, different solid components of the input ingredients are input at difference times and/or positions (e.g., at different module locations).

Block 310 illustrates inputting the solid components of the input ingredients input into the extruder (e.g., into the solid feed corresponding to the second module 210-2 included in the extruder 202 illustrated in FIG. 2B). It is appreciated that the solid components of the input ingredients may include one or more polymers, one or more plasticizers, one or more processing aids, one or more nucleators, one or more fillers, or combinations thereof. In some embodiments, a composition input into the extruder, by weight percent, includes a starch weight percent representative of the starch input into the extruder, a nucleator weight percent representative of the nucleator input into the extruder, a filler weight percent representative of the filler input into the extruder, a processing aid weight percent representative of the processing aid input into the extruder, or combinations thereof. It is appreciated that in some embodiments the starch weight percent is greater than the nucleator weight percent, the filler weight percent, and the processing aid weight percent. In the same or other embodiments, the solid components of the input ingredients input into the extruder further comprises chitosan. In some embodiments, the composition input into the extruder further includes a chitosan weight percent representative of the chitosan input into the extruder. In the same or other embodiments, the starch weight percent is greater than the chitosan weight percent.

In some embodiments, the composition input into the extruder further includes a plasticizer weight percent representative of the plasticizer input into the extruder. In the same or other embodiments, the plasticizer weight percent is greater than at least one of the nucleator weight percent, the filler weight percent, the processing aid weight percent, the chitosan weight percent, or the acid weight percent. In some embodiments, the solid components included in the input ingredients input ingredients input into the extruder further include one or more secondary plasticizers. In some embodiments, the composition input into the extruder further includes a secondary plasticizer weight percent representative of the one or more secondary plasticizers input into the extruder. In the same or other embodiments, the plasticizer is a primary plasticizer such that the plasticizer weight percent is greater than the secondary plasticizer weight percent. In some embodiments, the primary plasticizer includes urea or glycerol while the one or more secondary plasticizers include sorbitol, urea, glycerol, soybean oil, a polymeric plasticizer, or combinations thereof. In the same or other embodiments, the primary plasticizer is different than the one or more secondary plasticizers. For example, if glycerol is included in the primary plasticizer, then glycerol is not included in the one or more secondary plasticizers.

Block 315 shows inputting the liquid components included in the input ingredients into the extruder (e.g., into the liquid feed corresponding to the third module 210-3 of the extruder 202 illustrated in FIG. 2B). In some embodiments, the liquid components include acid, water, or combinations thereof. In the same or other embodiments, the composition input into the extruder further includes an acid weight percent representative of the acid input into the extruder. In some embodiments, the starch weight percent is greater than the acid weight percent. In some embodiments, the acid is acetic acid, hydrochloric acid, or the like. In one embodiment acid (e.g., acetic acid, hydrochloric acid, or the like) is input into the extruder along with the water to form an aqueous acidic solution. In some embodiments the water and acid may be mixed before entering a liquids feed (i.e., the input into the third module 210-3 illustrated in FIG. 2B).

In some embodiments, the input ingredients include multiple polymers, processing aids, nucleators, fillers, or combinations thereof In one embodiment the input ingredients includes starch (e.g., pea starch) as a primary polymer with the starch weight percent from 50% to 90%, chitosan as a secondary polymer with the chitosan weight percent from 0.5% to 10%, glycerol monostearate as a processing aid (e.g., a lubricant) with the processing aid weight percent from 1% to 5%, calcium carbonate as a filler and/or nucleator with a weight percent from 1% to 3%, talc as a filler and/or nucleator with a weight percent from 1% to 10%, sorbitol as a first plasticizer with a weight percent from 1% to 30%, urea as a second plasticizer with a weight percent from 1% to 30%, glycerol as a third plasticizer with a weight percent from 1% to 30%, acetic acid as an acid with an acid weight percent from 0.1% to 3%, and water with a water weight percent from 5% to 20%. It is appreciated that in some embodiments, one of the first, second or third plasticizers may correspond to the primary plasticizer with a greater weight percent than any other plasticizer included in the input ingredients (e.g., glycerol may be a primary plasticizer while urea and sorbitol may be secondary plasticizers). In some embodiments, the extrudate output from the extruder (see, e.g., block 320) may have the same or a similar composition as the input ingredients. However, in other embodiments, the composition may be different due, at least in part, to moisture evaporation that occurs during the extrusion process. It is appreciated that the degree of moisture evaporation plays a significant role in the properties of the extrudate and more specifically the foaming of the pellets since the moisture may be utilized as a primary foaming agent. In some embodiments the input ingredients may further include one or more dyes to impart color on the extrudate, pellets, and/or product produced from the pellets. It is appreciated that in some embodiments, the weight percent of the various components included in the input ingredients may be substituted by volume percent.

Block 320 illustrates outputting an extrudate from the extruder based on the input ingredients. In some embodiments the extrudate includes one or more of, each of, or combinations thereof the input ingredients (solid and/or liquid components included in the input ingredients). It is appreciated that liquid components included in the input ingredients may be absorbed, trapped, reacted, or otherwise contained within the solid components included in the input ingredients. In some embodiments, the extrudate has a density from 0.5 g/cm³ to 1.6 g/cm³. In other embodiments, the extrudate has a density greater than 1.6 g/cm³. In another embodiment, the extrudate has a density of less than 0.5 g/cm³. However, generally it is appreciated that the extrudate may have a density greater than the resultant product (see, e.g., block 335), which provides the advantageous effect of more efficient transportation of the extrudate (once appropriately prepared in block 325).

Block 325 shows chopping the extrudate (e.g., via chopper 255 illustrated in FIG. 2A) into pellets. As discussed previously, the pellets correspond to building blocks for forming one or more products. It is appreciated that the pellets may have the same or similar composition as the extrudate based, at least in part, on the input ingredients input into the extruder. Accordingly, in some embodiments, the pellets may have a similar composition, by weight percent, as the input ingredients. However, in other embodiments, the composition of the pellets may different slightly based on the total moisture content included in the pellets. In some embodiments, the total moisture content (e.g., water) included in the pellets (e.g., based on the water included in the input ingredients and processing settings of the extruder such as rate, temperature, pressure, and the like) is from 9% to 25% by weight. It is appreciated that in some embodiments, the moisture content included in the pellets may be utilized as a primary foaming agent for forming one or more foam-based products.

In some embodiments, the pellets are for manufacturing a biodegradable product and the pellets include one or more polymers, plasticizers, nucleators, fillers, processing aids, or combinations thereof. In some embodiments, a composition of the pellets, by weight percent, includes a starch weight percent representative of the starch included in the pellet and a plasticizer weight percent representative of the plasticizer included in the pellet. In some embodiments, the starch weight percent is greater than the plasticizer weight percent.

In the same or another embodiment, a density of the pellets is at least 0.5 g/cm³. In some embodiments, the plasticizer includes at least one of urea, sorbitol, glycerol, soybean oil, or a polymeric plasticizer, the nucleator includes at least one of talc, calcium carbonate, a clay compound, a mineral, or a fiber material, the filler includes at least one of a fiber material, flour, a powder, talc, or a waste product material, and the processing aid includes at least one of glycerol monostearate, glycerol distearate, a metallic stearate, a natural wax, or a synthetic wax.

In the same or other embodiments, the composition of the pellets includes at least one of a nucleator weight percent representative of the nucleator included in the pellet, a filler weight percent representative of the filler included in the pellet, or a processing aid weight percent representative of the processing aid included in the pellet. In one embodiment, the starch weight percent is greater than the nucleator weight percent, the filler weight percent, and the processing aid weight percent.

In some embodiments, the pellets further includes chitosan. In the same or other embodiments, the composition of the pellets further includes a chitosan weight percent representative of the chitosan included in the pellet. In one embodiment, the starch weight percent is greater than the chitosan weight percent. In another embodiment, the plasticizer weight percent is greater than at least one of, or each of, the nucleator weight percent, the filler weight percent, the processing aid weight percent, or the chitosan weight percent.

In some embodiments, the pellets further includes one or more secondary plasticizers such that the composition of the pellets further includes a secondary plasticizer weight percent representative of the one or more secondary plasticizers included in the pellet. In one embodiment, the plasticizer is a primary plasticizer such that the plasticizer weight percent is greater than the secondary plasticizer weight percent. In the same or other embodiments, the primary plasticizer includes urea or glycerol and the one or more secondary plasticizers include sorbitol, urea, glycerol, soybean oil, or a polymeric plasticizer. In most embodiments, the primary plasticizer is different than the one or more secondary plasticizers.

Block 330 illustrates inputting the pellets into an extruder (e.g., the same extruder utilized to form the pellets or a different extruder) or an injection molder. It is appreciated that the pellets may also be referred to as granules interchangeably. For example, each granule may correspond to an individual one of the pellets. In some embodiments the pellets/granules may be blended together to form a three-dimensional shape corresponding to one or more products (foamed-based or otherwise). In some embodiments, the pellets/granules have a first density. In one embodiment, the first density is greater than 0.5 g/cm³. In another embodiment, the first density is from 0.5 to 1.6 g/cm³.

Accordingly, it is appreciated that the pellets of embodiments described herein can be used to make three-dimensional shapes. Some of these three-dimensional shapes may be foams (e.g., a material that includes air or other gases trapped in pores so as to be less than the pellets). In some embodiments, the pellets may be input into an extruder or injection molder to be reformed into the three-dimensional shape to produce foam. In some embodiments, the pellets may be reformed using at least one of heat, pressure, solvents, or combinations thereof. In some embodiments, additional ingredients such as foaming agents (e.g., acids, bases, or the like) may be added to the extruder, an injection molder, or an air puffer to foam the pellets and create the three-dimensional foam shapes. In some embodiments, the total moisture (i.e., water) included or otherwise inherent in the pellets may be a primary foaming agent.

Block 335 shows outputting, from the extruder or the injection molder, an extrudate correspond to, at least in part, one or more products. In some embodiments, the one or more products has a second density less than the first density of the pellets/granules. In some embodiments, the second density is less than or equal to 0.3 g/cm³. In some embodiments, the three-dimensional shape of the one or more products includes at least one of a food packaging material, a sporting equipment, an electronics packaging material, an insulation packaging material, a cold-chain packaging material, an equipment packaging material, or an appliance packaging material.

Figure 4:
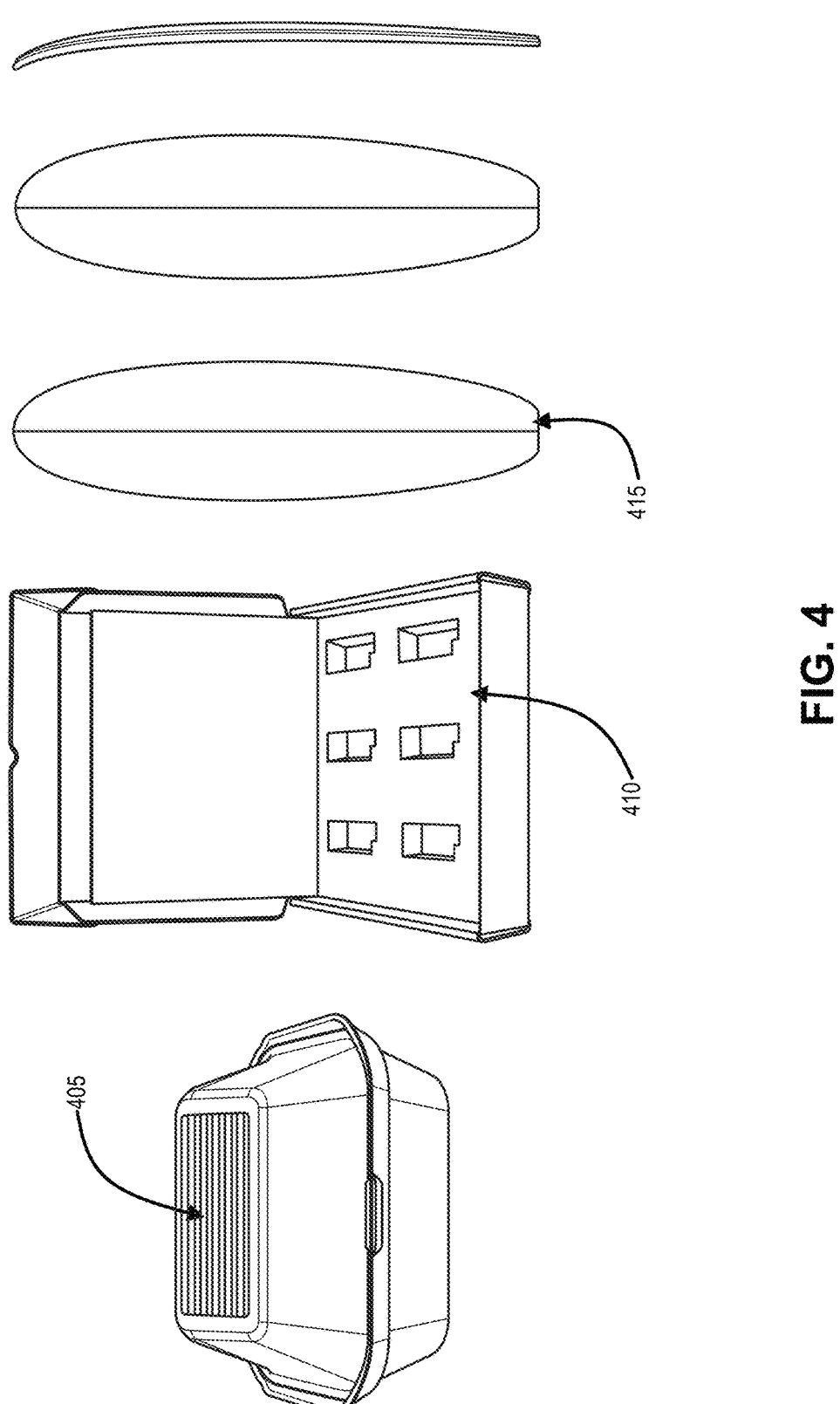
FIG. 4 illustrates example products with a three-dimensional shape produced with pellets, in accordance with embodiments of the present disclosure.

FIG. 4 illustrates example products with a three-dimensional shape produced with pellets, in accordance with embodiments of the present disclosure. As illustrated, the products may correspond to food packaging 405 (e.g., a clamshell packaging), electronics packaging 410 (e.g., a foam cut to hold cell phones), or sporting equipment 415 (e.g., a surfboard blank).

The above description of illustrated embodiments of the invention, including what is described in the Abstract, is not intended to be exhaustive or to limit the invention to the precise forms disclosed. While specific embodiments of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method, comprising:
inputting starch into an extruder;
inputting a primary plasticizer and a secondary plasticizer into the extruder, wherein the primary plasticizer includes urea, and wherein the primary plasticizer is different than the secondary plasticizer;
outputting an extrudate from the extruder, wherein the extrudate includes the starch, the primary plasticizer, and the secondary plasticizer, wherein a density of the extrudate is from 0.5 g/cm³ to 1.6 g/cm³; and
chopping the extrudate output from the extruder into pellets, wherein more of the primary plasticizer is input into the extruder relative to the secondary plasticizer such that a primary plasticizer weight percent is greater than a secondary plasticizer weight percent for the pellets.

2. The method of claim 1, further comprising:
inputting chitosan into the extruder, and wherein the primary plasticizer weight percent is greater than a chitosan weight percent for the pellets.

3. The method of claim 1, further comprising inputting at least one of a nucleator, a filler, or a processing aid into the extruder such that the extrudate further includes at least one of the nucleator, the filler, or the processing aid, wherein the primary plasticizer weight percent is greater than a nucleator weight percent, a filler weight percent, or a processing aid weight percent for the pellets.

4. The method of claim 3, wherein the nucleator includes at least one of talc, calcium carbonate, a clay compound, a mineral, or a fiber material, and wherein the filler includes at least one of a fiber material, flour, a powder, talc, or a waste product material, and wherein the processing aid includes at least one of glycerol monostearate, glycerol distearate, a metallic stearate, a natural wax, or a synthetic wax.

5. The method of claim 1, wherein a starch weight percent is greater than the primary plasticizer weight percent for the pellets.

6. The method of claim 5, further comprising inputting an acid into the extruder, wherein the composition input into the extruder further includes an acid weight percent representative of the acid input into the extruder, and wherein the starch weight percent is greater than the acid weight percent.

7. The method of claim 6, further comprising inputting water into the extruder.

8. The method of claim 1, further comprising:
inputting the pellets into the extruder to blend the pellets together; and
outputting, from the extruder, a foam based on the pellets, wherein a first density of the pellets is greater than a second density of the foam.

9. The method of claim 1, wherein more of the starch is input into the extruder relative to the primary plasticizer such that a starch weight percent is greater than the primary plasticizer weight percent for the pellets.

10. The method of claim 1, wherein the secondary plasticizer includes sorbitol, soybean oil, or a polymeric plasticizer.

11. The pellet of claim 1, wherein the secondary plasticizer includes sorbitol, soybean oil, or a polymeric plasticizer, and wherein the density of the pellet is from 0.5 to 1.6 g/cm³.

12. A pellet for manufacturing a biodegradable product, the pellet comprising:
starch; and
a primary plasticizer and a secondary plasticizer, wherein the primary plasticizer includes urea, wherein the primary plasticizer is different than the secondary plasticizer, wherein a primary plasticizer weight percent for the pellet is greater than a secondary plasticizer weight percent, wherein a starch weight percent for the pellet is greater than the primary plasticizer weight percent, and wherein a density of the pellet is at least 0.5 g/cm³.

13. The pellet of claim 12, wherein the secondary plasticizer includes soybean oil.

14. The pellet of claim 12, further comprising at least one of a nucleator, a filler, or a processing aid, wherein the primary plasticizer weight percent is greater than a nucleator weight percent, a filler weight percent, or a processing aid weight percent for the pellet, wherein a starch weight percent is greater than the primary plasticizer weight percent for the pellet.

15. The pellet of claim 12, wherein the nucleator includes at least one of talc, calcium carbonate, a clay compound, a mineral, or a fiber material, and wherein the filler includes at least one of a fiber material, flour, a powder, talc, or a waste product material.

16. The pellet of claim 12, wherein the pellet further includes chitosan, wherein the primary plasticizer weight percent is greater than a chitosan weight percent of the pellet.

17. The pellet of claim 14, wherein the processing aid includes glycerol monostearate or glycerol distearate.

18. The pellet of claim 14, wherein the processing aid includes a metallic stearate, a natural wax, or a synthetic wax.

19. The pellet of claim 12, further comprising:

chitosan with a weight percent in the pellet from 0.5% to 10% glycerol monostearate with a weight percent in the pellet from 1% to 5% calcium carbonate with a weight percent in the pellet from 1% to 3%;

talc weight a weight percent from 1% to 10% acetic acid with a weight percent from 0.1% to 3%; and water with a weight percent from 5% to 20%, and wherein a starch weight percent for the pellet is from 50% to 90%.

\* \* \* \* \*